United States Patent [19]

Taplin

[11] 3,896,917

[45] July 29, 1975

[54] BINARY BAR CODE PRINTING DEVICE AND BINARY BAR CODE PRINTED MATTER

[75] Inventor: John F. Taplin, West Newton, Mass.

[73] Assignee: Taplin Business Machines Incorporated, Burlington, Mass.

[22] Filed: June 23, 1972

[21] Appl. No.: 265,637

[52] U.S. Cl. ........... 197/1 R; 101/399; 235/61.12 R

[51] Int. Cl. ...... B41j 3/00; B41b 1/02; G06k 19/06

[58] Field of Search ............... 340/46.3 Z, 166.3 A; 197/1 R, 1 A; 235/61.11, 61.12

[56] References Cited

UNITED STATES PATENTS

| | | | |
|---|---|---|---|
| 2,350,893 | 6/1944 | Hofgaard | 197/1 R |
| 2,788,879 | 4/1957 | Rand | 197/1 |
| 2,848,088 | 8/1958 | Shaw | 197/1 |
| 3,044,696 | 7/1962 | Feissel | 340/146.3 A |
| 3,340,984 | 9/1967 | Smith | 197/1 |
| 3,461,427 | 8/1969 | Parker | 340/146.3 Z |
| 3,600,557 | 8/1971 | Zappia | 235/61.11 E |
| 3,617,707 | 11/1971 | Shields | 235/61.11 E |
| 3,649,814 | 3/1972 | Spanjersberg | 340/146.3 Z |
| 3,700,858 | 10/1972 | Murthy | 340/146.3 Z |
| 3,701,097 | 10/1972 | Wolff | 340/146.3 Z |
| 3,701,886 | 10/1972 | Jones | 235/61.11 D |
| 3,761,685 | 9/1973 | Alpert et al. | 235/61.11 E |

OTHER PUBLICATIONS

IBM Technical Disclosure Bulletin, Vol. 14, No. 8, Jan. 1972, "Variable Velocity Reader Logic," M. E. Houdek.

*Primary Examiner*—Edgar S. Burr
*Assistant Examiner*—Paul J. Hirsch
*Attorney, Agent, or Firm*—Erwin Salzer

[57] ABSTRACT

A printing device for printing information in binary bar form includes a set of types all having the same size and having different bar symbols on the faces thereof wherein all constituent types of the set include four of bars and three of inter-bar spaces, each of said bar symbols beginning with a bar and each of said symbols forming a pattern of alternating bars and inter-bar spaces, said bars having either of two different widths and said inter-bar spaces having either of two different widths so that said bars are binary and said inter-bar spaces are also binary.

Further disclosed are preferred dimensions for the constituent bars and spaces of such a set of types and printed matter produced with such a set of types.

11 Claims, 11 Drawing Figures

CMC — 7 Font

| | $2^6$ | $2^5$ | $2^4$ | $2^3$ | $2^2$ | $2^1$ | $2^0$ |
|---|---|---|---|---|---|---|---|
| 64 | 1 | 0 | 0 | 0 | 0 | 0 | 0 |
| 50 | 0 | 1 | 1 | 0 | 0 | 1 | 0 |
| 40 | 0 | 1 | 0 | 1 | 0 | 0 | 0 |
| 30 | 0 | 0 | 1 | 1 | 1 | 1 | 0 |
| 10 | 0 | 0 | 0 | 1 | 0 | 1 | 0 |
| 5 | 0 | 0 | 0 | 0 | 1 | 0 | 1 |
| A | 1 | 0 | 0 | 0 | 0 | 0 | 1 |
| B | 0 | 1 | 0 | 0 | 0 | 0 | 1 |
| C | 1 | 1 | 0 | 0 | 0 | 0 | 1 |
| D | 0 | 0 | 1 | 0 | 0 | 0 | 1 |

BINARY BAR CODE PRINTING DEVICE AND BINARY BAR CODE PRINTED MATTER

BACKGROUND OF THE INVENTION

The prior art methods of recording and reading binary words or characters, and the equipment used for that purpose, are subject to serious limitations which will be considered below more in detail. It is the principal object of the invention to improve recording and reading binary coded information, primarily information relating to binary coded alphanumeric characters.

Two transmission circuits for binary coded information operating in parallel and transmitting the same information can readily indicate the occurrence of an error. Such parallel transmission of identical binary coded information is, however, relatively expensive and not feasible at all in many instances.

Another method of increasing redundancy and thereby detecting errors is to resort to error detecting codes, e.g. codes including parity bits. This, however, reduces drastically the information-carrying part of any message and increases greatly the cost of the signal processing logic circuitry. There are instances where the parity check method is hardly applicable and error detection by this method hardly possible. One such instance is the printing of digital information in form of bar patterns where the width of a type is not sufficient to add parity check bits to the information-carrying bits.

The invention relates to a system wherein parity bits are entirely eliminated and error detection can be achieved by an anaylsis of the information-carrying bar pattern.

To facilitate error detection is, however, only one of the various aspects of the present invention. Other important aspects are good adaptation to the requirements of printing devices, in particular typewriters, and allowing readout by relatively simple scanning read-out devices, either of the magnetic type, or of the optical variety.

The invention relates also to means for improving input into data transmission and data processing systems, and for improving the output from such systems. To this end, the number of bars per character is minimized, and error detection achieved by means other than parity bits, thus maximizing the information content of every symbol and making it possible for every symbol to fit into the space of a standard typewriter slug. Prior art bar coded types are either too large to be applicable in connection with standard typewriters, or require extreme accuracy in print quality. This, in turn, calls for frequent realignment and maintenance procedures. The width of code bar sets may compel deletion of a parity code bar, and consequent lack of error detection, or verification.

The binary symbols of typewritten matter embodying this invention may be read by single channel line scan type reading heads, either of the optical or of the electromagnetic type.

If the printing ink is not magnetic, the reading head will be an optical head wherein narrow slices of the printed symbols are analyzed. The aforementioned type of reading heads, i.e. single channel optical reading heads, is disclosed, for instance, in U.S. Pat. No. 3,466,451 to L. J. Hanchett, Jr.; Sept. 9, 1969 for PHOTOELECTRIC DEVICE FOR SENSING INDICIA ON A MOVING MEDIUM.

U.S. Pat. No. 3,044,696 to H. G. Feissel; July 17, 1962 for PROCESS FOR DATA RECORDING discloses a type which can be read by the human eye, and also read and processed by machine means. The principles underlying the above patent have resulted in various types of equipment, and in various systems of data processing. The best known of these systems is the European Computer Manufacturers Association or ECMA system, as specified in the CMC-7 standard of the above referred-to association. The CMC-7 font includes 6 information bits and 7 fixed bits, or a total of 13 bits. This is too much for U.S.A. typewriters. The CMC-7 font must use highly stylized alphanumeric symbols, and for this reason is difficult to read it visually. Particular difficulties with the CMC-7 font arise in connection with certain symbols such as punctuation marks and quotation marks.

It is, therefore, another principal object of this invention to provide a set of types, or a printing device having a set of types, in particular a typewriter, which is not subject to the limitations and drawbacks of prior art means which are predicated upon the teaching of the above patent to H. G. Feissel.

SUMMARY OF THE INVENTION

A printing device embodying this invention, e.g. a typewriter intended to print information in binary bar form, includes a set of types all having the same size and having different bar symbols on the faces thereof. The constituent types of the set of types have character bar symbols on the faces thereof, said symbols being formed of four bars and three inter-bar spaces. Each of said bar symbols begins with a bar and each of said bar symbols forms a pattern of alternating bars and inter-bar spaces. Each of said bars has either of two different widths, and each of said inter-bar spaces has either of two different widths so that said bars are binary, and said inter-bar spaces are also binary.

BRIEF DESCRIPTION OF THE DRAWINGS

FIG. 1*b* to systems having seven rather than five information digits per character and shows the information and control bit cells of such a system, and FIG. 2 to the so-called CMC-7 font and shows an imprint of the numeral 1 in the aforementioned font, indicating dimensions in terms of millimeters;

THE PRIOR ART

This invention has aspects of a modernized teleprinter, better known by its trademark TELETYPE. For this reason a brief review of prior art teleprinters and a comparison thereof with the present invention is in order. The teleprinter as originally conceived by Emile Baudot and still widely used is based on $2^5 = 32$ combinations of marks (current-pulse) and spaces (no current pulse). In other words, the teleprinter in its original form is based on a 5-unit permutation code. It has a three row 32-key transmitting keyboard including several special keys as for carriage return, etc. Most of the keys may be used for producing a pair of characters rather than but only one. This is achieved by means akin to upper-case-lower-case means in a conventional typewriter. The so-called Baudot code is an equal-length code wherein each character is defined by five binary elements. The keyboard sets up a parallel presentation of each character, converted for transmission into serial time-sequential form, and then re-converted at the receiving end into parallel presentation resulting in a character imprint.

Figure 1A:
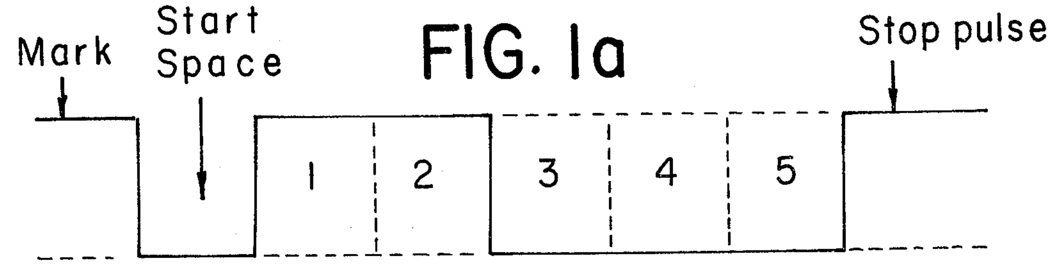
PRIOR ART FIG. 1a
FIGS. 1*a*, 1*b* and 2 relate to prior art systems, FIG. 1*a* more particularly to the so-called Baudot five information digits per character system and shows a current trace plotted versus time.

FIG. 1*a* shows the current trace of a Baudot code letter A. It includes - in addition to five pulse or no-pulse time intervals - for each character a start bit (a space) and a stop bit (a mark). These start and stop bits are necessary means for synchronizing a teleprinter transmitter and a teleprinter receiver, and result in an unfavorable ratio of information bits to control bits.

Figure 1B:
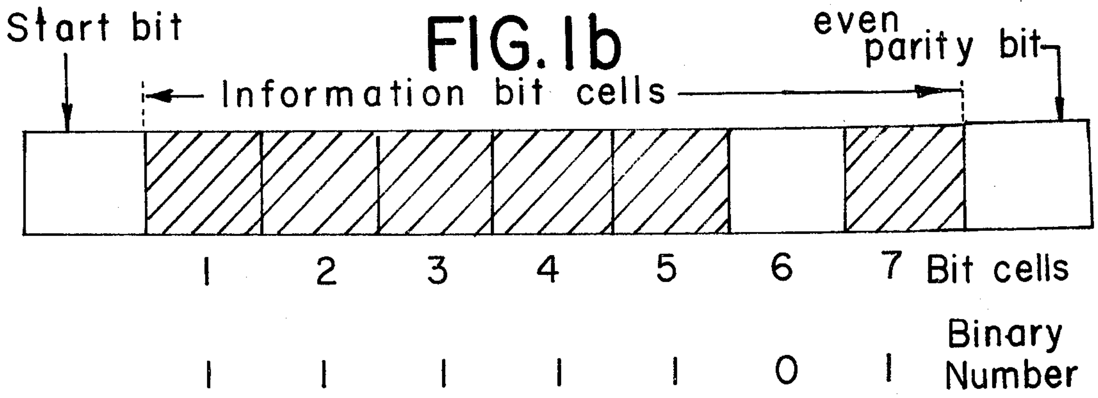

Another system of recording, storage and transmission of data is based on the U.S.A. Standard Code for Information Interchange, or briefly the ASCII-code. This code is a seven bit code accommodating a large number of characters, i.e. about $2^7$ or 128 characters. It is necessary for purposes of synchronization to add a starting bit and a parity bit may be added for error detection to the aforementioned seven bits, thus increasing their number to 9. FIG. 1*b* shows diagrammatically a seven bit character plus its synchronization bit and its parity bit.

It is apparent from FIG. 1*b* that the information bit content of every signal is relatively small, and further that resynchronization occurs only at the start of each character rather than at the end of each of its constituent bit cells. The bit cells are formed by printed bars and by inter-bar spaces whose width is more or less inaccurate. This inaccuracy is increased by changes in the substrate (paper or tape) on which the intelligence, information or data is printed. Frequency drift of strobout during read back is another ground for inaccuracy, and shifts in the speed of line scan during optical or magnetic reading of an ASCII bar pattern is still another reason resulting in inaccuracies. The sum total of the aforementioned inaccuracies tends to cause synchronization mismatch. This is a serious limitation of all prior art systems based on the ASCII code, irrespective of whether or not a parity bit was included, and irrespective of the specific error control means applied in connection with it.

The most important outgrowths of the system disclosed in the above referred-to U.S. Pat. No. 3,044,696 are the CMC-7 FONT referred-to above, and COC-5 FONT.

Figure 2:
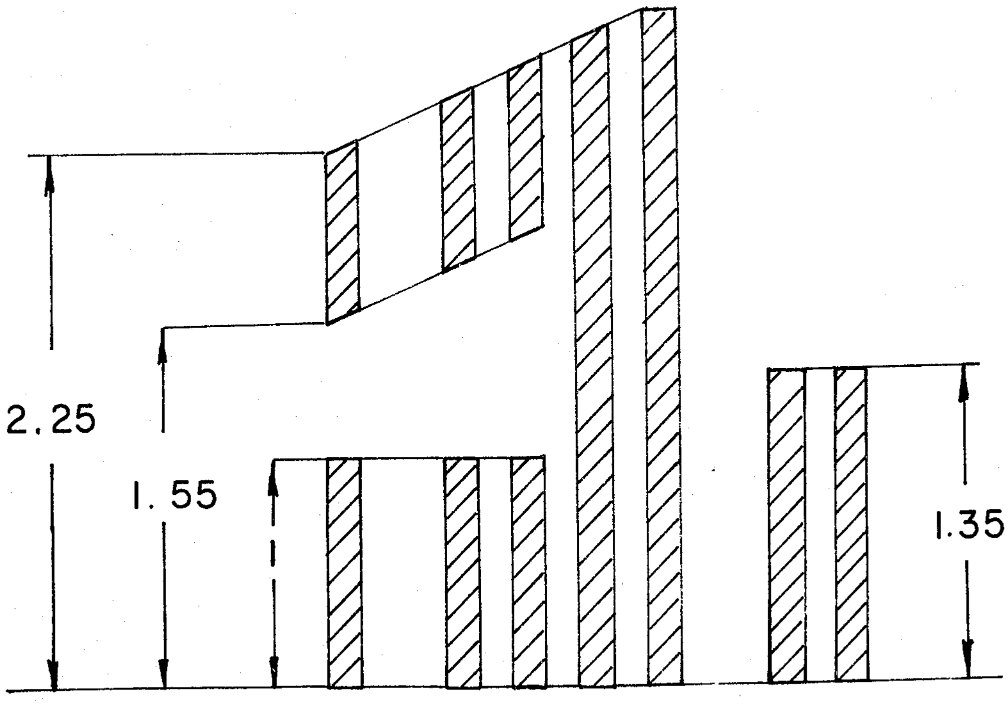

FIG. 2 shows the number 1 as it appears in CMC-7 FONT. The width of the bars is constant and the width of the spaces varies. The first bar in the CMC-7 FONT is a resynchronization or timing bar followed by binary information bars. The CMC-7 FONT has standard dimensions not fitting U.S. typewriter standards or, to be more specific, the standard character width of the CMC-7 FONT is much too large to fit U.S. typewriter standards or, to be more specific, the 10 character per inch pitch information density generally adopted in U.S. typewriter technology. For technical reasons it is impossible to produce a font similar to, but smaller than, the CMC-7 FONT. Other limitations and drawbacks of the CMC-7 FONT have been stated above.

The fact that the CMC-7 FONT is incompatible with U.S. typewriter standards was conducive to evolving a new somewhat similar font known as COC-5 FONT. It follows the general philosophy of the CMC-7 FONT, except that the number of bars is reduced to five, and the number of inter-bar spaces to four so that the total number of bars and inter-bar spaces is nine. As a result of this change the COC-5 FONT is compatible with U.S. typewriter standards. The COC-5 FONT has found very limited application in the USA because it is only capable of coding a total of 16 characters such as, for instance, the numbers 0 through 9 plus 6 other symbols, or characters.

The CMC-7 FONT is mostly used in Europe for printing documents, particularly bank checks, with magnetic inks combined with magnetic read back heads. The COC-5 FONT was developed for use with regular or not magnetic printing inks and to be read back by using optical read heads.

DESCRIPTION OF PREFERRED EMBODIMENTS OF THE INVENTION

Considering a binary bar code of the kind which has been outlined above embodying this invention, the number of code combinations, or code symbols, which may be produced with such a code is given by the equation $$n=2^{(b+s)}, \tag{1}$$

wherein *n* is the number of code combinations or code symbols, *b* is the number of bars, and *s* the number of spaces. Typical typewriters have 88 characters. The number *n* of possible combinations to cover such a range of characters makes it necessary that the number *b* equal to 4 and the number *s* equal to 3. This then yields the equation $$n=2^{(4+3)} \tag{1a}$$

$=2^7$
$=128.$

Thus a four-bar-and-three-space code system has a coding capacity by far exceeding that of typical or conventional typewriters.

0 may be represented either by a bar having the width *a* or by a space having the width *b*. It has been assumed that *b*=*a*. 1 has be represented by either a bar having the width k.a or by a space having the width k.b The diagram of FIG. 3*a* refers to a coding system wherein each character is formed by four bars and three inter-bar spaces. The left column in FIG. 3*b* includes the decadic numerals 64,50,40,30,10,5 and the letters A,B,C,D. The digital terms in the various rows include seven information bits. These seven information bits are translated into seven corresponding bar bits in the right column of FIG. 3*b*. The various characters included in that column do not include a start bit, nor do they include a parity bit. Thus the entire space left in each type for bar coding can be used for information bits. How this is possible will be explained below more in detail. The seven information bits of FIG. 3*b* are the binary equivalents of numerals 64 down to 5 and of the letters A–D expressed by the ASCII code.

The value k is an expression of the ratio between wide bars and narrow bars and wide inter-bar spaces and narrow inter-bar spaces. The narrow bar width *a* does not need to be equal to the narrow space width *b*, and the wide bar width k.*a* does not need to be equal to the wide space width k.b as assumed in FIGS. 3*a* and 3*b*. The table below indicates width assignments for binary code patterns suitable for electric typewriters typing 10 characters per inch. These dimensions apply to the font on the type elements rather than to the image as typed on paper.

Wide bar width = 0.0125 inch
Wide space width= 0.015 inch
Narrow bar width= 0.005 inch
Narrow space width= 0.006 inch The ratio between wide bars and narrow bars, and the ratio between wide spaces and narrow spaces are distinguishing ratios inasmuch as the magnetic or photoelectric read back heads and logic or detection circuits can more readily distinguish between binary values if these ratios are relatively large. These ratios should be equal or larger than 1.5. The above figures are predicated on distinguishing ratios of 2.5, i.e. the wide bars are 2.5 times wider than the narrow bars and the wide spaces, or wide inter-bar spaces, are 2.5 times wider than the narrow spaces, or narrow inter-bar spaces.

Figure 3A:
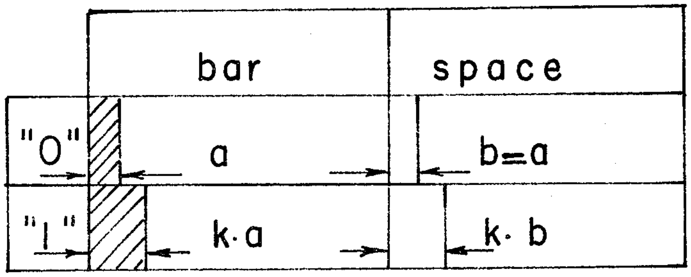
FIG. 3*a* shows diagrammatically an alternating bar-and-space system according to the present invention.
Figure 3B:
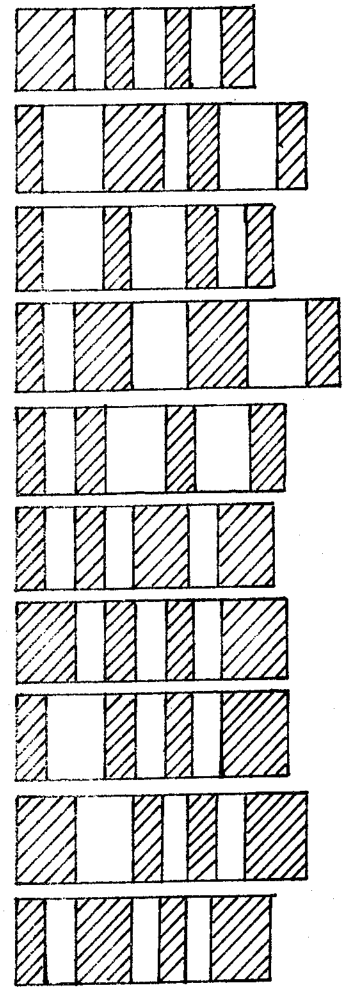
FIG. 3*b* shows in the column at the left the decadic numbers 64, 50, 40, 30, 10 and 5 followed by the letters A, B, C, D, the above numbers being followed in each row by the binary equivalent thereof, and the letters A–D being followed in each row by the binary ASCII code representation thereof, and FIG. 3*b* further shows to the right of each row an imprint according to this invention of the binary symbols appearing in each adjacent row.

It will be appareent from FIG. 3*a* that the width of the bars and the width of the inter-bar spaces may assume either of two fixed values and it will be apparent from the right hand portion of FIG. 3*b* that bar code symbols embodying this invention are of variable length and that the constituent bars of each character are of equal height.

Figures 4, 5, 6, 7, 8, 9:
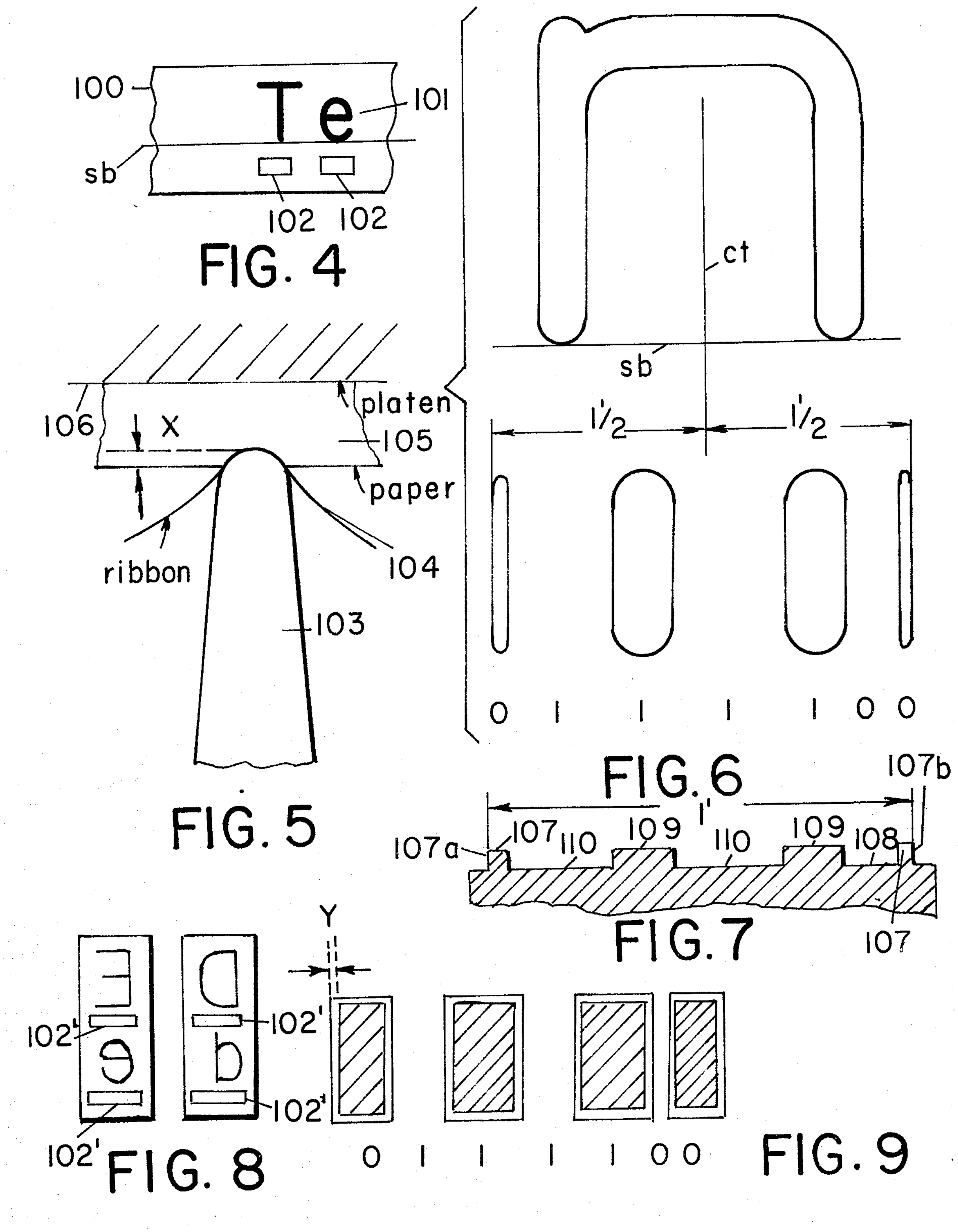
FIG. 4 is a front view of a telegraph type tape embodying the present invention.
FIG. 5 is a diagrammatic representation of the process of imprinting a code symbol upon a sheet of paper as, for instance, by means of an electric typewriter.
FIG. 6 shows on a relatively large scale an imprint of the letter *n* and an imprint of a binary bar code equivalent thereof, the bar code equivalent being 0,1,1,1,1,0,0.
FIG. 7 shows in cross-section a type face embodying this invention for printing the binary code symbol 0,1,1,1,1,0,0.
FIG. 8 are front views of two type slugs for a typewriter embodying the present invention.
FIG. 9 is a diagrammatic representation of an imprint of the binary signal 0,1,1,1,1,0,0.

FIG. 4 shows a telegraph paper strip or similar substrate 100 having two rows of information types thereon. Row 101 is formed by alphanumeric characters. Under each alphanumeric character is a binary bar code pattern 102 which corresponds to the alphanumeric character arranged above it. The novelty of the article of manufacture shown in FIG. 4 consists in the particular bar patterns 102 as explained above. The bar pattern of FIG. 4 may be formed by any desired seven-bit-per-character code.

FIG. 5 shows the impact of a constituent bar 103 of a binary bar code type of a typewriter embodying this invention upon a ribbon 104 and a sheet of paper 105 backed by a platen 106. The width of the imprint of the bar 103 upon the paper 105 depends upon the width of the bar 103 including the side angle thereof, but in addition thereto upon the physical characteristics of the ribbon, the ink, the paper and the platen. For these reasons the width of the printed bars cannot be fully specified in terms of the type faces by which the bars are printed. In FIG. 5 the character X has been applied to indicate the depth of penetration of bar 103 into the surface of the paper 105, known as embossment.

FIG. 6 shows a printed visually readable letter *n* and below it a bar pattern which corresponds to the letter *n*. The bar pattern is written in a novel or unconventional code and corresponds to the binary number 0,1,1,1,1,0,0. 0 appears twice as a narrow bar and once as a narrow space. 1 appears twice as a wide bar and twice as a wide space.

In the cross-section of a type shown in FIG. 7 for printing the bar pattern of FIG. 6, reference character 107 has been applied to indicate the ridges printing the narrow bars that stand for 0, reference character 108 has been applied to indicate the recess that causes formation of the narrow inter-bar space that stands for 0, reference character 109 has been applied to indicate the two wide bars that stand for 1 and reference character 110 has been applied to indicate the two recesses that cause formation of the wide inter-bar spaces that stand for 1.

FIG. 8 shows in front view two typewriter slugs intended for a typewriter embodying this invention including upper case letters E,D and lower case letters *e*,*d* and further including binary code bar symbols for the above referred-to letters which code bar symbols have been indicated in FIG. 8 diagrammatically by rectangles 102'.

FIG. 9 shows a bar pattern representing the digital number 0,1,1,1,1,0,0. The four hatched rectangles represent the constituent bars of a binary bar type. Each hatched rectangle is surrounded by a wider rectangle. These wider rectangles represent the imprints made on a paper or a like substrate resulting in a relative increase of the width of the bars and a relative decrease of the width of the inter-bar spaces. Reference character Y has been applied to indicate the increase of the width of each printed bar relative to the width of the bar-imprinting type ridge. The increase in width Y occurs to both sides of each bar-imprinting type ridge. Any reading device for code patterns under consideration must be able to compensate for the relative increase of bar width and the relative decrease of space width. The embossment Y remains constant for each bar set or bar pattern, as long as all other conditions remain constant such as the hardness of the paper on which the bar pattern is typed, the hardness of the platen by which the paper is being backed up, etc.

Reading of the bar code involves measurements of bar width and space width in terms of time. Since there are but two bar widths and two space widths to be measured, the reading logic circuitry can be relatively simple. Reference may be had to the copending patent applications of Leland J. Hanchett, Jr. filed 09/17/73, Ser. No. 398,035 for BAR CODE PROCESSING AND DETECTING SYSTEM; filed 09/17/73, Ser. No. 398,135 for BAR GEOMETRY VERIFICATION SYSTEM FOR BAR CODED CHARACTERS and filed 10/15/73, Ser. No. 406,518 for ERROR DETECTION AND SEQUENCE MAINTAINING SYSTEM FOR BAR-CODE READERS for more information relating to preferred reading logic circuitry for reading documents printed with printing devices embodying the present invention.

If the timed width of a wide bar exceeds the read-out time assigned to it, or if the timed width of a narrow bar is less than the read-out time assigned to it, then the read-out logic rejects the character under consideration. The present system thus has inherent error detection means and this makes it possible to dispense with error detection means as, for instance, parity bits, reducing the relative information content of a message because of its error detection content.

A printing machine embodying the present invention produces bar patterns which make it possible to re-synchronize the timing clock in a read-out system at the beginning of each new bar and at the beginning of each new space. This dispenses with the start bit or start space of the prior art illustrated in FIGS. 1*a* and 1*b*. Since the prior art start timing action occurs only at the beginning of each character, the timing signal is "flying blind" between start bits. Considering any prior art binary bar code printed matter with one start bit at the beginning of each bar code set, or character, in connection with such printed matter inaccuracies may result from variations of the width of the printed bars, from dimensional changes of the message-bearing paper which may be caused by changes of the moisture content of the ambient atmosphere. Inaccuracies may further occur by changes of the relative velocity between read-out head and the bar pattern to be read, and also by changes of the frequency of the master timing clock. The present system is not subject to these drawbacks and limitations because it lends itself to resynchronization at various points of a bar code set, i.e. at the beginning of each consecutive bar and at the beginning of each consecutive space within each individual bar code set rather than only at the start of each bar code set.

A paper strip as shown in FIG. 4 as well as any other record embodying this invention includes a record-bearing substrate supporting a machine readable substance representing information in binary form. The substance is arranged in aligned arrays of bar symbols each having a substantially rectangular shape as shown to the right of FIG. 3*b*. The outline encompassing the four bars of FIG. 6 is likewise substantially rectangular. Each of the arrays begins on one side thereof, i.e. the left side thereof, with a bar and each of the arrays includes four bars three inter-bar-spaces forming a pattern of alternating bars and inter-bar-spaces. Each of said bars has either of two different widths and each of said inter-bar spaces has either of two different widths so that said bars are binary and said inter-bar spaces are also binary.

An article of manufacture or record as specified above should comply with the following four conditions $A = k.a$ $B = m.b$ $k \geqq 1.5$ $m \geqq 1.5$ wherein $a$ and A are the widths of the constituent bars of the aforementioned arrays, $b$ and B are the widths of the constituent in-bar spaces of said arrays, and $k$ and $m$ are constants. It will be apparent that the table of FIG. 3*a* is but simplified a form of the general four aforementioned conditions. For reasons of best width discrimmination $k$ and $m$ ought to be at least 1.5, and preferably as large as 2.5. In the above equation $a$ should preferably be smaller than $b$ and A smaller than B. For standard typewriters $a$ should preferably be in the order of 0.005 inch and $b$ in the order of 0.007 inch.

The embossment of FIG. 5 is defined as the average distance between paper surface and ink surface. It has an influence on the wave form of the read-out signal as is apparent from FIG. 9 and the context thereof. Because of embossment the geometry of a type face, on the one hand, and the geometry of an imprint of the type face, on the other hand, differ to a certain extent. The geometry of a type face is generally defined by the geometry of an imprint thereof produced under specified conditions. Type dimensions are generally deduced from printing image dimensions after correction for the effects involved in the printing process.

In FIG. 4 reference character sb has been applied to indicate the base line of alphanumeric characters. Slugs as shown in FIG. 8 for printing machines embodying this invention call for special alphanumeric characters, i.e. alphanumeric characters having no portions or "tails" extending below the base line sb. Letters such as *g* or *p* normally having portions or tails extending below the base line must be re-designed to comply with the above requirement. This can readily be achieved. The letter *e* of FIG. 4 and like letters normally lacking a tail must not necessarily be re-designed. The elimination of tails is desirable for providing more space for the bar-and-space arrays 102' of FIG. 8 and better discrimination between the alphanumeric symbols and the bar symbols of the aformentioned arrays 102'. It will be apparent from FIG. 8 that the bar code symbols 102 form rectangles of which one is arranged below the upper case letters and the other is arranged below the lower case letters. The faces of the type slugs are rectangular and the long sides of the rectangles formed by bar code symbols 102' are parallel to the short sides of the rectangles formed by the faces of the types and the short sides of the rectangles formed by bar code symbols 102' are parallel to the long sides of the rectangles formed by the faces of the types. The provision of an upper case letter, its seven digit bar symbol and a lower case letter and its seven digit bar symbol on such a small area as the face of a 10 characters per inch standard type slug is made possible by the particular code shown in FIGS. 3*a* and 3*b* and described in the context thereof.

Each bar symbol has a certain length indicated by the letter 1' in FIG. 7. The length 1', i.e. the spacing between the leading edge 107*a* of the first bar and the trailing edge 107*b* of the last bar of each symbol, may vary from bar symbol to bar symbol, as clearly apparent from FIG. 3*b*. The edge 107*a* is always spaced ½ 1 foot from the center line of each slug or type block. In other words, the spacing of the leading edge 107*a* of the first bar of each bar symbol included in a set of types from the center line of each type of said set of types is equal to one half of the length 1 foot of the respective bar symbol thereon.

As a consequence of the above, in printed matter including both alphanumeric symbols and bar symbols each bar symbol projects an equal distance ½ foot from the center line of the alphanumeric symbol. In FIG. 6 reference character ct has been applied to indicate the center line of the alphanumeric character *n*. It is apparent that the outer edges of the two 0 bars are spaced about ½ foot from the center line ct disregarding possible slight deviations due to embossment. Since it is good practice to keep down embossment to such an extent that it can hardly be detected by eye or touch, it is safe to state that in print embodying this invention each bar symbol extends equal lengths to both sides of the center line of each type face.

It will be apparent from the above that the present 4 bar-three-spaces system applied in typewriters or other printing devices embodying this invention facilitate verification because the number of bars in each character set, or on each type, is fixed and constant. This constant number is counted by the read-out logic, and if the number of bars is not correct, the logic circuitry rejects the particular character. Since only two values are assigned to bar width, read-out logic can readily be set-up to check whether or not the timed widths are only the two assigned values.

Since a standard typewriter has generally 88 character types and since a bar code including four bars and three spaces has a coding capacity up to, or of, 128 characters, the coding capacity of the aforementioned code exceeds the coding capacity needs of standard typewriters.

Regarding the aspect of reading printed matter embodying this invention, it will be apparent that reading is greatly facilitated by virtue of the fact that all the bars of each symbol have the same length and define with the ends thereof a rectangular outline. Thus reading is limited to sensing one single quantity, i.e. the width of bars and that of inter-bar spaces.

The separation of visually readable alphanumeric symbols and of machine readable symbols is just the opposite of what is aimed in the above referred-to U.S. Pat. No. 3,044,696 providing symbols which can be read visually as well as by machine. The aforementioned separation makes it possible to design the visually readable alphanumeric symbols so as to optimize visual readability and to design the bar coded symbols so as to optimize machine readability. Both requirements are clearly incompatible and, therefore, compromises between them are hardly indicated. It is apparent from the numerical figures which have been stated above for the sizes of bars and spaces that the present bar code can be miniaturized to such an extent as to be unobtrusive when visually reading associated alphanumeric text, and yet yield highly reliable information when read by machine.

It will be apparent from the foregoing that this invention makes it possible to compress in terms of space self-clocking seven digit bar coded characters to an extent that could not be achieved heretofore. It will also be apparent from the foregoing that this invention provides type sets for typewriters having type slugs of standard size, i.e. capable of typing 10 alphanumeric or other man readable characters per inch, and capable of typing 88 characters, or even a larger number of characters, wherein the constituent type slugs of the set have two alphanumeric or other man readable characters on the faces thereof, and in addition thereto two corresponding self-clocking seven digit machine readable bar-coded characters. While the information content of each bar-coded character is constant, namely 7 bits, the width of the characters may vary as shown to the right of FIG. 3*b*, and the code bars forming various characters are aligned horizontally to form arrays signifying words, as indicated in FIG. 4.

I claim as my invention:

1. A printing device for printing information simultaneously in form of man readable characters and in binary bar form, said printing device including a set of types having the same size and having different bar symbols of equal height on the faces thereof, the constituent bar symbols of said set being members of a group including 128 possible combinations each formed by four bars and three inter-bar spaces, each of said bar symbols forming a pattern of alternating bars and inter-bar spaces, and each of said bar symbols beginning with a bar and ending with a bar, each of said bars having either of two different fixed widths and each of said inter-bar spaces having either of two different fixed widths so that the possible number of said bar symbols of said set complies with the equation $128=2^{(b+s)}$, wherein $b$ is the number of said bars of each of said bar symbols on the faces of said types of said set and $s$ is the number of said inter-bar spaces of each of said bar symbols on the faces of said types of said set, said two different fixed widths of said bars including a wide and a narrow bar width, and said two different fixed widths of said inter-bar spaces including a wide and a narrow inter-bar space width, said wide inter-space width exceeding said wide bar width and said narrow inter-space width exceeding said narrow bar width.

2. A printing device as specified in claim 1 wherein each of the bar symbols on the faces of said set types is arranged within a rectangular outline bisected by a center line coextensive with the center line of the face of each type of said set of types.

3. A printing device as specified in claim 1 wherein each of said types of said set of types has such a size as to make it suitable for typewriters typing 10 characters per inch and includes in addition to a pair of alphanumeric symbols a pair of bar symbols whose constituent bars are positioned vertically.

4. A printing device as specified in claim 3 wherein said alphanumeric symbols lack portions extending below the base line thereof.

5. A printing device as specified in claim 3 wherein the spacing of the leading edge of the first bar of each of said bar symbols from the center line of each of said set of types is equal to one half of the length of the bar symbol thereon.

6. A set of types for typewriters having a 10 characters per inch information density wherein a. the types of said set have on the faces thereof an upper case letter, a bar coded character corresponding to said upper case letter, a lower case letter and a bar coded character corresponding to said lower case letter;

b. said bar coded character corresponding to said upper case letter and said bar coded character corresponding to said lower case letter are each members of a group including 128 possible combinations of which each is formed by four bars of equal height and three inter-bar spaces having either of two different widths, and each of said characters beginning with a bar and ending with a bar, and wherein c. the width of the narrower inter-bar spaces of said bar-coded character corresponding to said upper case letter and said lower case letter exceeds the width of the narrower bars thereof, and wherein the width of the wider inter-bar spaces of said bar coded character corresponding to said upper case letter and said lower case letter exceeds the width of the wider bars thereof.

7. A set specified in claim 6 wherein the bar coded character corresponding to the upper case letter of each of said types of said set has a substantially rectangular outline and is arranged below the upper case letter of each of said types of said set, and wherein the bar coded character corresponding to the lower case letter of each of said types of said set has a substantially rectangular outline and is arranged below the lower case letter of each of said types of said set.

8. A printing device having a set of types for producing printed documents including both man readable characters in excess of 32 such characters and machine readable symbols each corresponding to one of said man readable characters including a set of types having faces of standard size for reading man readable characters with an information density of 10 characters per inch, said faces of said types being substantially rectangular and having narrow sides and wide sides, and the faces of the constituent types of said set of types having two superimposed man readable characters thereon, and the faces of the types of said set further having two bar coded symbols thereon of which each is substantially in the shape of a rectangle whose sides are parallel to said narrow sides of said faces of said types, and whose narrow sides are parallel to said wide sides of the faces of said types, each of said bar coded symbols including four bars of equal height and three inter-bar spaces, each of said four bars having either of two fixed widths and each of said inter-bar spaces having either of two fixed widths, each of said bar coded symbols beginning with a bar and ending with a bar, and the narrower of said inter-bar spaces being wider than the narrower of said bars, and the wider of said inter-bar spaces being wider than the wider of said bars.

9. A printing device having a set of types of standard size for printing man readable characters with an information density of 10 characters per inch having substantially rectangular faces with narrow sides and wide sides, each of said faces being provided with a pair of man readable characters and a pair of seven bit bar coded characters corresponding to said pair of man readable characters, each of said pair of seven bit bar coded characters being arranged below one of said pair of man readable characters and having an outline substantially in the shape of a rectangle whose wide sides are parallel to the narrow sides of said faces of said types of said set and whose narrow sides are parallel to the wide sides of the faces of the types of said set, each of said pair of seven bit bar coded characters including four bars of equal height and three inter-bar spaces, each of said four bars having either of two fixed widths and each of said three inter-bar spaces having either of two fixed widths, each of said seven bit bar coded symbols beginning and ending with a bar and the ratio of said two fixed widths of said bars and the ratio of said two fixed widths of said inter-bar spaces both being in excess of 2.0, and the width of the narrower inter-bar spaces exceeding the width of the narrower of said bars, and the width of the wider of said inter-bar spaces exceeding the width of the wider of said bars.

10. A type slug for typewriters, said type slug having a. a substantially rectangular face of such standard size as to achieve an information density of 10 characters per inch, said face being bounded by wide sides and by narrow sides;

b. an upper case letter and a lower case letter on said face;

c. a first seven bit bar coded character arranged below said upper case letter and a second seven bit bar coded character arranged below said lower case letter, said first and said second bar coded character each having an outline substantially in the shape of a rectangle whose wide sides are parallel to said narrow sides of said face and whose narrow sides are parallel to said wide sides of said face, each said first and said second bar coded character including four bars of equal height and three inter-bar spaces, each of said four bars having either of two fixed widths and each of said three inter-bar spaces having either of two fixed widths, and said first and said second bar coded character each beginning with a bar and ending with a bar;

d. the width of the narrow inter-bar spaces exceeding the width of the narrow bars, and the width of the wide inter-bar spaces exceeding the width of the wide bars; and wherein e. the ratio of the width of the wide bars to the width of the narrow bars and the ratio of the width of the wide inter-bar spaces to the width of the narrow inter-bar spaces is larger than 1.5.

11. A printing device for printing information simultaneously in form of man readable characters and in binary bar coded form, said printing device including a set of types having the same size and having both man readable characters and bar coded characters on the faces thereof, each of said bar coded characters being formed by alternating bars and spaces, each including four bars and three spaces, each beginning with a bar and ending with a bar, each of said bars of each of said bar coded characters having either of two different fixed widths, and each of said spaces having either of two different fixed widths so that each of said bar coded characters is one of the 128 possible combinations that can be formed by said bars and spaces, said two different fixed widths of said bars including a wide bar width and a narrow bar width, and said two different widths of said spaces including a wide space width and a narrow space width, and said wide space width exceeding said wide bar width, and said narrow space width exceeding said narrow bar width.

* * * * *